Jan. 11, 1972  G. F. KLEPP ET AL  3,634,571

LEAD WIRE LOCATING DEVICE

Filed Feb. 11, 1970  2 Sheets-Sheet 1

Inventors
GEORGE F. KLEPP
DOUGLAS H. ROWLANDS
By Edward Goldberg
Attorney

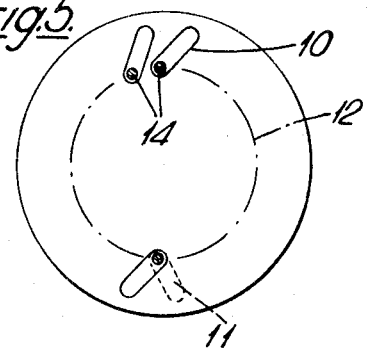
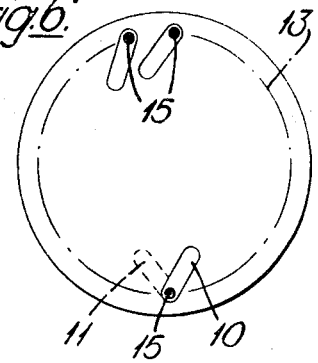
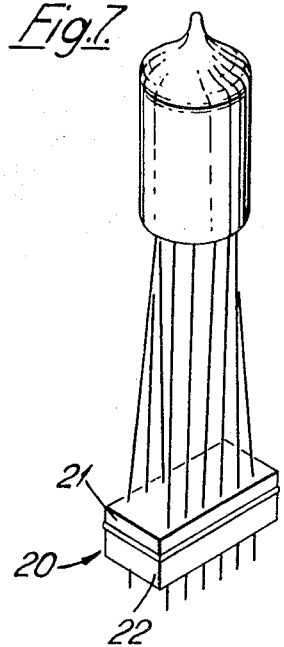
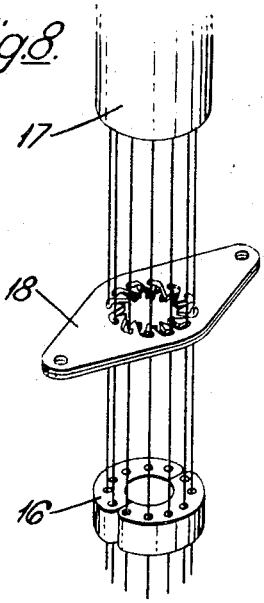
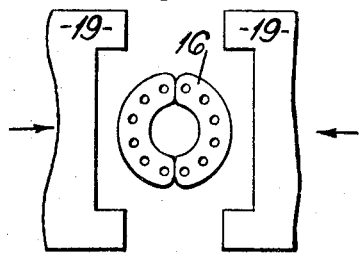
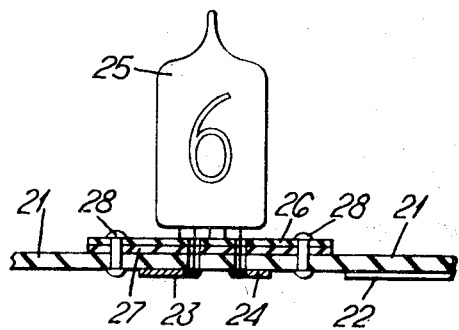

United States Patent Office 3,634,571
Patented Jan. 11, 1972

3,634,571
LEAD WIRE LOCATING DEVICE
George Francis Klepp and Douglas Henry Rowlands, Paignton, England, assignors to International Standard Electric Corporation, New York, N.Y.
Filed Feb. 11, 1970, Ser. No. 10,540
Claims priority, application Great Britain, Feb. 14, 1969, 8,244/69
Int. Cl. B29d 3/00; B29c 24/00
U.S. Cl. 264—138
9 Claims

ABSTRACT OF THE DISCLOSURE

A method of and a device for locating in a given pattern a plurality of flexible wires projecting from a component, such as flying lead wires projecting from a numerical indicator tube. The device comprises a pair of plastic discs, each disc having a central aperture and a plurality of angular slots equally spaced from and communicating with the aperture and inclining opposite to those of the other disc. The flexible wires are bunched and passed through the apertures of the two discs. The two discs are then slid down in sequence to the base of the component so that the leads fit into corresponding slots of the two discs. The two discs are then rotated in opposite directions to enclose the leads within the holes made by the oppositely inclined overlapping portions of the slots from the two discs. The two discs may be then withdrawn together to adjacent the ends of the wires, which ends are then correctly located.

BACKGROUND OF THE INVENTION

Field of the invention

This invention relates to a method of and a device for locating flexible wires projecting from a component, and more particularly, to a method of and a device for locating flexible flying lead wires projecting from an electrical component.

DESCRIPTION OF THE PRIOR ART

Electric discharge tubes for use in circuit applications are frequently provided, instead of with relatively rigid valve pins for plugging into an appropriate socket, with long flexible leads usually referred to as flying leads. The flying leads are intended for soldering directly into circuit as connecting leads without the use of intermediate valve sockets, even though the discharge device itself may be held in some form of support rather than being suspended from its leads. For some applications the flying leads have to be inserted through respective holes in a mounting plate, for example a printed circuit board. This can prove a difficult and time-consuming operation because the leads will have to be fed through their holes sequentially, one at a time and there may be for example as many as thirteen leads from a single valve base.

SUMMARY OF THE INVENTION

It is therefore an object of the present invention to provide a device for locating in a given pattern a plurality of flexible lead wires projecting from a component.

It is another object of this invention to provide a device for locating in a given pattern a plurality of flying leads which project from an electrical component substantially parallel to and equally spaced from a central axis.

It is a further object of the present invention to provide a method for locating in a given pattern a plurality of flexible lead wires projecting from a component, such as a plurality of flying leads projecting from a numerical indicator tube.

It is a still further object of the present invention to provide an improved method for locating in a given pattern a plurality of flexible wires projecting from a component that overcomes the aforementioned shortcomings and problems in the prior art method.

In accordance with the present invention there is provided a combing device for locating in a given pattern normal to a central axis the free ends of a multiplicity of flexible leads which can be bunched together and which at their other ends project from an electrical component parallel to and equally spaced from the same axis, the device including a pair of centrally apertured discs each having a respective similar angular slot for each one of the lead wires affording a passage for its lead wire extending from the central aperture in the disc to the radial position for the end of that wire in the given pattern, the arrangement being such that when the discs are superimposed on one another in a given orientation with the slots in one disc oppositely inclined to those in the other, a respective lead wire locating hole through the pair of discs in each of the appropriate positions in the said pattern is provided by the overlapping slots.

The device may be made in plastics material with the two discs secured together around the lead wires of the component and left in position when the component is wired in circuit. The device then affords a convenient means for mounting the component on a printed circuit board, for example.

BRIEF DESCRIPTION OF THE DRAWINGS

The invention will be described further with reference to the accompanying drawings in which:

FIGS. 5 and 6 illustrate the use of an additional pair of discs to bring the free ends of the lead wires to a different pitch circle or configuration to that at the valve base;

FIG. 7 is a view of a valve having lead wires sealed in parallel rows through a block of insulating material;

FIGS. 8 and 9 illustrate stages in the production of the lead wire arrangement of FIG. 7; and FIG. 10 is an elevational view of a numeral indicator tube having flying leads which are held in position by a device according to the present invention and secured to a circuit board by means of the device, the combing device and circuit board being shown in section.

DETAILED DESCRIPTION OF THE PREFERRED EMBODIMENTS

Figure 1:
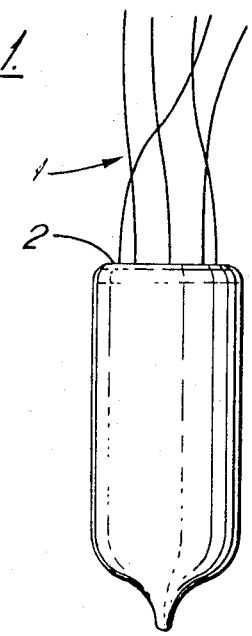
FIG. 1 is a diagrammatic elevational view of an electronic valve having a multiplicity of flexible lead wires brought out from the valve base.

The valve of FIG. 1 has a multiplicity of flexible lead wires 1 led out from a base 2. At the base 2 the lead wires are, of course, held in a given pattern, and for a short distance from the base they are sufficiently rigid for them to project parallel to one another in that pattern. Further away from the base they tend to become disoriented and, in practice, are frequently bunched and twisted together until it is required to connect them into circuit. They then have to be properly sorted out and aligned, normally in the same pattern as at the base 2.

Figure 2:
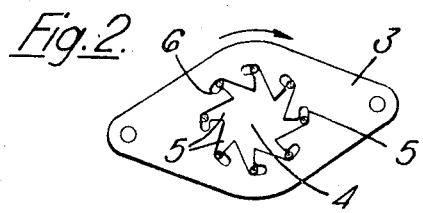
FIG. 2 is a plan view of one of the pair of discs forming a device in accordance with the invention.
Figure 3:
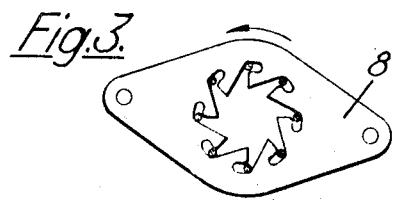
FIG. 3 is a similar view of a second disc with its slots oriented in the opposite directions to those of the first disc.

FIG. 2 shows a disc 3 forming part of a combing device according to the invention and having a central aperture 4 and a pattern of hook-shaped angular slots 5 communicating with a central aperture and each terminating in a rounded base portion 6 for reception of a lead wire. Each slot is inclined at the same angle to the radius through its base portion and has tapering sides. The disc of FIG. 3 is similar except that its slots are oppositely directed.

To align the ends of the lead wires remote from the valve base, the disc of FIG. 2 is threaded over the bunched wires and allowed to rotate into a position such that as it is brought up against the valve base without permanently distorting the lead wires. Each lead wire falls into a respective one of the slots and into the rounded base portion 6 at the end of the slot. The slot is slightly elongated in the direction opposite to the arrow at the top of the figure so that a slight rotation of the disc in the direction of the arrow brings each wire into the elongated portion until it contacts the base portion 6. The disc of FIG. 3 is now similarly threaded over the lead wires and brought into position against the first disc, being given, finally, a slight rotation in the opposite direction to that imparted to the first disc.

Figure 4:
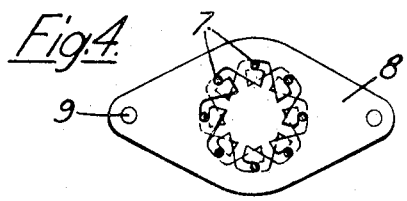
FIG. 4 shows the two discs superimposed with the lead wires located between them in their proper pattern.

The resulting position of the two discs and the lead wires is shown in FIG. 4. The slots of one disc are now closed over by the other disc leaving each of the lead wires 7 locked in the respective pair of aligned holes through the two discs.

The two discs are now held together without relative rotation and withdrawn along the length of the lead wires, which are able to slide through the aligned pairs of holes, until the pair of discs is brought adjacent the free ends of the lead wires. The free ends of the lead wires are now aligned in the same pattern as at their ends adjacent the valve base and may be inserted simultaneously through holes in a mounting plate or the like arranged in the same pattern.

For convenience of handling, the two discs may be of elongated external shape as shown to provide projecting ears 8 by means of which they may be manipulated and brought into coincidence with one another. The ears 8 are pierced with holes 9 so that the two discs may be pinned together.

After having inserted the leads into the appropriate holes in the mounting plate on which the component is to be used, the pair of discs may be removed from the lead wires, for example by cutting through the pair of discs and severing the ears 8 so that the discs fall apart. Alternatively, if made of insulating material, they may be slid back along the the lead wires and used as a mounting means for the component, as will be described with reference to FIG. 5.

In some cases it is desired to locate the free ends of the lead wires in positions around a circle of larger diameter than that from which they originate at their ends adjacent the electrical component, or, indeed, to place them in a non-circular arrangement. In such cases a second pair of discs, as illustrated in FIGS. 5 and 6, provided with slots in analogous manner to the discs of FIGS. 2 to 4, may be used in conjunction with a pair of discs as previously described. The second pair of discs, which need not have a central aperture, has slots 10, 11 extending from a first circle 12, of diameter equal to that from which the wires originate, to the positions the respective wires are finally to occupy, shown in FIG. 6 as a circle 13. The first pair of discs, clamped together, is slid along the wire until adjacent their ends, the second pair of discs is threaded over the wires as shown at 14, FIG. 5, and then mutually rotated, after the first pair of discs has been retracted or removed, to bring the lead wires into the desired final position, as shown at 15, FIG. 6.

In some cases it may be desired to mold the lead wires, at a sufficient distance from the component to avoid damage, into a block of plastics with the free ends of the wires projecting a short distance therethrough in, say, a pair of parallel rows to match up with integrated circuits and the like encapsulated with lead wires projecting in what is known as a "dual in line" arrangement, and illustrated in FIG. 7. One method by means of which such a dual in line lead arrangement may be obtained is illustrated in FIGS. 8 and 9. Referring to FIG. 8, a specially shaped preform 16 of partially cured plastics material, having holes for the lead wires arranged around a circle of diameter equal to their originating pitch circle on the base of the valve 17, is threaded over the lead wires with the aid of a combing device 18 according to the invention. The combing device 18 is removed and the preform 17, with the lead wires projecting therethrough, is placed between a pair of molding jaws 19 which are then pressed together, as indicated by the arrows, to bring the preform to its final shape as shown at 20 in FIG. 7. An alternative method is to make the two discs of a combing device according to the invention of somewhat thick partially cured plastics material and of general shape, when brought together, similar to that of the preform 16, and, after application to the lead wries, performing a final molding operation as indicated in FIG. 9. The two discs thus become one integral plastics block 20.

In the embodiment of FIG. 10 a printed circuit board 21 having a pattern of conductors such as 22, 23 and 24 on its underside, as viewed in the drawing, is pierced with apertures to receive the flying leads of a numeral indicator tube 25. The apertures for the flying leads in the printed circuit board are arranged in the same pattern as prevails among the leads at the base of the valve. The leads have been threaded through their respective apertures with the aid of a combing device consisting of a pair of insulating discs 26 and 27 similar to the arrangement of FIGS. 2 to 4. The discs are secured to the printed circuit board by means of pins 28. The lead wires are passed through respective interconnection conductors such as 23 and 24 bonded onto the board 10 and are cut off so as to project one slightly beyond the conductive surface of the interconnection pattern. The leads are then secured by flow soldering the under surface of the circuit board simultaneously with other components, not shown, mounted on the same side of the circuit board as the indicator tube 25. Instead of rivetting over the lower ends of the pins 28, the pins may be left plain and projecting slightly and flow soldered to hold the pair of discs in position on the board.

It is not necessary to use differently patterned discs for the two discs of a pair; each may be of the same pattern but mounted back to back so that their slots are oriented in opposite directions. The discs could be of molded plastics with a peg and hole method of joining, the pegs replacing the rivets 28 and being a push fit also into holes in the circuit board.

It is to be understood that the foregoing description of specific examples of this invention is not to be considered as a limitation of its scope.

What is claimed is:

1. A device for locating in a given pattern normal to a central axis the free ends of a plurality of flexible lead wires projecting from a component substantially parallel to and equally spaced from said axis comprising a centrally apertured disc having a plurality of similar angular slots disposed about the periphery of the aperture, each slot accommodating a respective lead wire and affording a passage for said lead wire from said central aperture to a radial position for said wire in said given pattern.

2. A device in accordance with claim 1 further comprising a second apertured disc having slots inclined oppositely to those in the other disc such that when the discs are superimposed one over the other in a given orientation a respective lead wire locating hole through the pair of discs in each position in said pattern is provided by the overlapping slots.

3. A device in accordance with claim 2 wherein the slots have rounded portions at the ends to accommodate said lead wires the discs are of insulating material.

4. A device in accordance with claim 2, wherein said discs have projecting portions adapted for mounting said device.

5. A device in accordance with claim 2, further comprising a second pair of discs, each disc of said second pair having similar angular slots which are oriented oppositely to those in the other paired disc, the slots being located further away from the central axis than those in said first pair of discs such that when said second pair of discs are superimposed one over the other, a respective lead wire locating hole is provided by the overlapping slots of said second pair of discs further removed from the central axis than that of said first pair.

6. A method of locating in a given pattern normal to a central axis the free ends of a plurality of flexible lead wires projecting from a component substantially parallel to and equally spaced from said axis comprising the steps of:
   bunching and inserting said flexible lead wires through an aperture of a centrally apertured disc having a plurality of similar angular slots each accommodating a respective lead wire, the slots extending about the periphery of the central aperture and arranged in said given pattern;
   sliding the disc toward the component so that each lead wire fits into a corresponding one of the slots; and
   rotating said disc to position the plurality of lead wires in the end portions of the slots thereby locating the lead wires in said given pattern.

7. A method in accordance with claim 6, wherein the method further comprises the steps of:
   bunching and inserting said flexible lead wires through an aperture of a second centrally apertured disc having a plurality of similar angular slots inclined opposite to those in the first apertured disc;
   sliding the second disc onto the first disc such that each lead wire fits into a corresponding one of the slots; and
   rotating the first and second disc in opposite directions for locating the lead wires in the holes provided by the overlapping portions of the slots of the first and second discs.

8. A method in accordance with claim 7 including after locating the flexible lead wires in the given pattern by rotating the first and second discs, the further steps of inserting the free ends of the flexible lead wires into a partially cured plastic preform having holes arranged in the given pattern, molding the partially cured plastic into a predetermined shape, curing the plastic, and cutting the first and second discs away.

9. A method in accordance with claim 8, wherein the partially cured plastic and the first and second discs are molded together into a predetermined form and cured.

References Cited

UNITED STATES PATENTS

| | | | |
|---|---|---|---|
| 2,536,677 | 1/1951 | Brunner et al. | 29—203 |
| 3,255,280 | 6/1966 | Burrowes | 264—277 |
| 3,321,825 | 5/1967 | Cooke | 29—203 |
| 3,447,224 | 6/1969 | Helda | 140—147 |

LOWELL A. LARSON, Primary Examiner

U.S. Cl. X.R.

29—203 P; 140—147; 264—263, 272, 277